Figure 1:
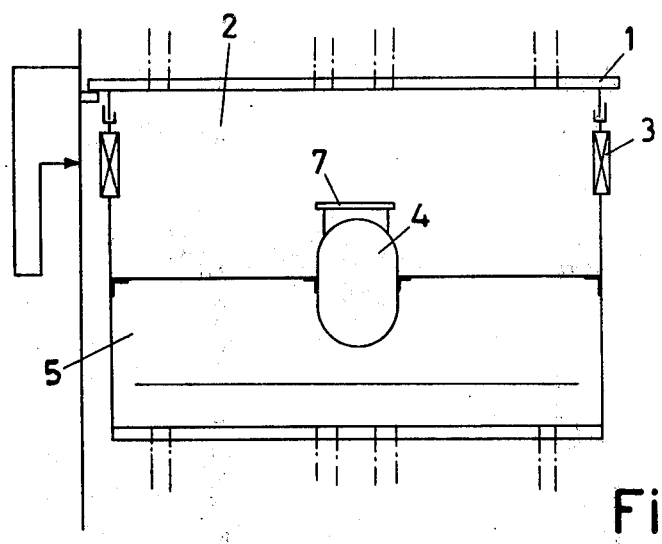

United States Patent [19]

Pagani

[11] 4,062,734
[45] Dec. 13, 1977

[54] APPARATUS FOR DESALINATING SEA WATER

[75] Inventor: Giorgio Pagani, Milan, Italy

[73] Assignee: Snamprogetti S.p.A., Milan, Italy

[21] Appl. No.: 692,774

[22] Filed: June 4, 1976

[30] Foreign Application Priority Data

June 6, 1975  Italy .................................. 24079/75

[51] Int. Cl.² .............................................. B01D 3/28
[52] U.S. Cl. .................................. 202/236; 202/237; 159/18
[58] Field of Search .............. 202/236, 237; 159/17 C, 159/17 R, 18, 46

[56] References Cited

U.S. PATENT DOCUMENTS

| | | | |
|---|---|---|---|
| 3,304,242 | 2/1967 | Lockman | 159/18 |
| 3,344,041 | 9/1967 | Wulfson | 159/18 |
| 3,481,835 | 12/1969 | Carnavos | 159/17 P |
| 3,820,581 | 6/1974 | Machida et al. | 159/18 |
| 3,824,154 | 7/1974 | Takada et al. | 159/18 |
| 3,824,155 | 7/1974 | Takada | 159/18 |

*Primary Examiner*—Hiram H. Bernstein
*Attorney, Agent, or Firm*—Morgan, Finnegan, Pine, Foley & Lee

[57] ABSTRACT

A sea water desalination system which is composed by a compact and self-contained unit, each unit comprising several evaporation stages, means being provided for recycling the condensates and for dissipating the pressure differential existing between the brine-containing tub and the tube plate of each individual stage.

4 Claims, 2 Drawing Figures

APPARATUS FOR DESALINATING SEA WATER

This invention relates to an apparatus for desalinating sea water.

An apparatus for desalinating sea water is known from U.S. Pat. No. 3,961,658 from U.S. application Ser. No. 603,186, which is a continuation of U.S. application Ser. No. 376,949 now abandoned, of which the present application is the first addition.

The apparatus referred to above, which operates according to a multiple-action principle, for the detailed description of which reference should be had to the main patent, consists of one or more vertical cylindrical columns which are subdivided into a plurality of stages. Each stage is composed by two vertical film-evaporators with tube plates in the shape of a circular segment having in their midpoint the horizontal preheater for sea water. A stage, composed in this way, is especially functional for high-output installations in which, inter alia, it is not possible to provide a single evaporator on account of the considerable size the tube plate would consequently have.

The apparatus of the present invention may be briefly described as an apparatus for desalinating sea water that is composed by a vertically positioned column subdivided into a plurality of cylindrical sections, each of which comprises the following component parts:

a. a film-evaporator in a tube bundle vertical arrangement having preferably a circular cross-sectional outline, without any outer casing;

b. a tub which is connected at the bottom portion with the top tube plate of the evaporator of the same cylindrical section, in the last section which is deprived of the evaporator, the tub being connected to the brine-discharge tube, and connected at the top with the bottom tube plate of the evaporator of the overlying section, said tub being connected, in the first cylindrical section, to the sea water feeding tube;

c. a lamination system arranged at the bottom of the tub and having the purpose of allowing the flow of the brine from the tub to the underlying tube plate by dissipating the positive pressure differential obtaining between the tub and the tube plate;

d. openings formed through the upper sidewall of the tub, except that of the first cylindrical section;

e. one or more siphoning tubes for taking the condensate collected at the bottom of each cylindrical section to recycle the condensate at intermediate points of the subsequent cylindrical section;

f. a preheater housed in a throughtube having a circular or elliptical or rectangular cross-section, the tube being diametrically passed through the tube and welded thereto, the heating means being the steam produced in every cylindrical section, also the steam of the last section being condensed.

For small and average size installations, it has now been found that the preheater can suitably be installed in a through-tube placed in the brine-containing tub, a fact which enables a single evaporator to be used for each stage while thus reducing the bulk of the column and of the brine-containing tubs, the result being a first cost economy.

Reference being had to the accompanying drawings, the device the subject of the present invention will be described, this disclosure being intended as an explanation only which does not limit the invention. With reference to FIG. 1 which shows the longitudinal cross-sectional view of a portion of the column, a desamination stage is described which is composed by:

a single film-evaporator with a circular cross-section plate 1.

a tub 2, with a hydraulic seal, for collecting the brine and equipped with laminar separator 3 from which steam emerges.

a through-tub 4 having an elliptical or circular or rectangular cross-section which diametrically passes through the tub and is welded thereto, the pre-heater being housed in said tube.

a second tub 5 for collecting the brine to be fed to the film evaporator a manhole 7 located in the top portion of the through-tube 4 and which gives an easy access to the tub.

Figure 2:
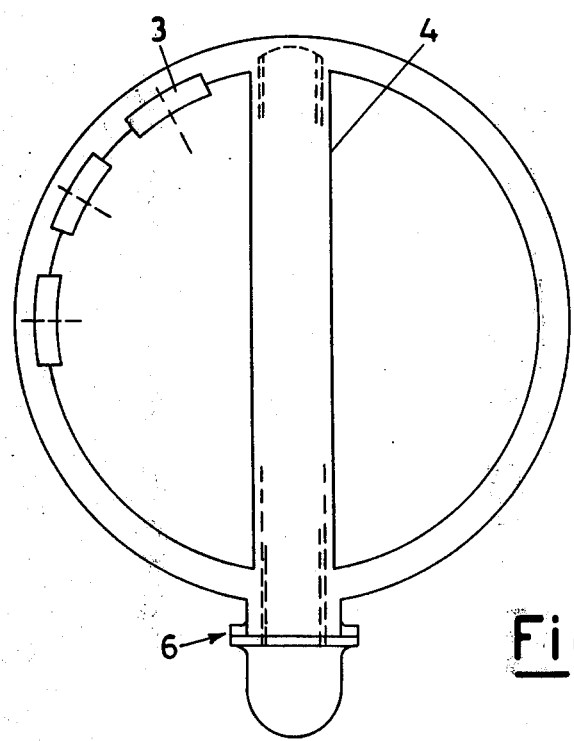

Referring to FIG. 2, which shows the cross-sectional view of a portion of a column, there can be seen the preheater 6, the laminar separators 3 and the through-tube 4.

What I claim is:

1. In an apparatus for desalinating sea water characterized in that it is composed by a vertically positioned column subdivided into a plurality of cylindrical sections, each of which comprises the following components:

a. a film-evaporator in a tube bundle vertical arrangement having a circular cross-sectional outline, without an outer casing;

b. a tub which is connected at the bottom portion with the top tube plate of the evaporator of the same cylindrical section, the tub in the last section being deprived of the evaporator and being connected to the brine discharge tube, and connected at the top with the bottom tube plate of the evaporator of the overlying section, said tub being connected, in the first cylindrical section to the sea water feeding tube;

c. a lamination system arranged at the bottom of the tub that is adapted to allow brine to flow from the tub to the underlying tube plate by dissipating the positive pressure differential that is obtained between the tub and the tube plate;

d. openings formed through the upper sidewall of the tub, except that of the cylindrical section;

e. one or more siphoning tubes for taking the condensate collected at the bottom of each cylindrical section to recycle the condensate at intermediate points of the subsequent cylindrical section; the improvement which comprises;

f. a preheater housed in a through-tube, the tube being passed through the tub and welded thereto.

2. The apparatus for desalinating water as defined in claim 1 wherein the through tube for housing the preheater has a circular cross-section.

3. The apparatus for desalinating water as defined in claim 1 wherein the through tube for housing the preheater has a rectangular cross-section.

4. The apparatus for desalinating sea water as defined in claim 1 wherein the through tube for housing the preheater has an elliptical cross-section.

* * * * *